US008303391B2

(12) United States Patent
Englman et al.

(10) Patent No.: US 8,303,391 B2
(45) Date of Patent: Nov. 6, 2012

(54) WAGERING GAME WITH BONUS FEATURE THAT PERFORMS SECONDARY ANALYSIS TO DETERMINE AWARD

(75) Inventors: Allon G. Englman, Chicago, IL (US); Jeremy M. Hornik, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 2443 days.

(21) Appl. No.: 10/876,984

(22) Filed: Jun. 25, 2004

(65) Prior Publication Data

US 2005/0288088 A1 Dec. 29, 2005

(51) Int. Cl.
*A63F 9/24* (2006.01)
*A63F 13/00* (2006.01)

(52) U.S. Cl. ................ 463/13; 463/11; 463/16; 463/19; 463/22

(58) Field of Classification Search .............. 463/19–20, 463/11, 13, 17
See application file for complete search history.

(56) References Cited

U.S. PATENT DOCUMENTS

| | | | | |
|---|---|---|---|---|
| 6,015,346 | A | 1/2000 | Bennett | 463/20 |
| 6,089,976 | A | 7/2000 | Schneider et al. | 463/16 |
| 6,126,542 | A | 10/2000 | Fier | 463/16 |
| 6,190,255 | B1 | 2/2001 | Thomas et al. | 463/20 |
| 6,315,660 | B1 | 11/2001 | DeMar et al. | 463/16 |
| 6,346,043 | B1 | 2/2002 | Colin et al. | 463/17 |
| 6,347,996 | B1 | 2/2002 | Gilmore et al. | 463/17 |
| 6,533,658 | B1 * | 3/2003 | Walker et al. | 463/13 |
| 6,607,437 | B2 | 8/2003 | Casey et al. | 463/16 |
| 6,695,695 | B2 * | 2/2004 | Angel | 463/13 |
| 2002/0119813 | A1 * | 8/2002 | Colin et al. | 463/11 |
| 2003/0153379 | A1 * | 8/2003 | Beaulieu | 463/16 |
| 2004/0082376 | A1 * | 4/2004 | Baerlocher et al. | 463/16 |

OTHER PUBLICATIONS

Super Slash. "The Legend of Zelda: Ocarina of Time / Master Quest FAQ/Walkthrough" Dated: Nov. 21, 1998 <URL: http://www.gamefaqs.com/console/gamecube/file/564226/48794>.*

* cited by examiner

*Primary Examiner* — Steven J Hylinski
(74) *Attorney, Agent, or Firm* — Nixon Peabody LLP

(57) ABSTRACT

A method of playing a wagering game on a gaming terminal. The gaming terminal displays a plurality of indicia during the wagering game, which are then selected via player inputs. The selected indicia are revealed and arranged into groups corresponding to winning combinations. The arrangement is made so as to maximize at least one of the plurality of pre-defined winning combinations.

47 Claims, 9 Drawing Sheets

WAGERING GAME WITH BONUS FEATURE THAT PERFORMS SECONDARY ANALYSIS TO DETERMINE AWARD

FIELD OF THE INVENTION

The present invention relates generally to gaming terminals and, more particularly, to a gaming terminal having a bonus game that performs secondary analysis of selections to determine the bonus award.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is that of a progressive jackpot. In the gaming industry, a "progressive" involves collecting coin-in data from participating gaming device(s) (e.g., slot machines), contributing a percentage of that coin-in data to a jackpot amount, and awarding that jackpot amount to a player upon the occurrence of a certain jackpot-won event. The percentage of the coin-in is determined prior to any result being achieved and is independent of any result. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement.

Another concept that has been employed is the use of a "secondary" or "bonus" game which may be played in conjunction with a "basic" game. The bonus game may comprise any type of game, either similar to or completely different from the basic game, and is entered upon the occurrence of a selected event or outcome of the basic game. Such a bonus game produces a significantly higher level of player excitement than the basic game because it provides a greater expectation of winning than the basic game.

In some current bonus games, the player is merely a spectator while the bonus is being awarded. This can lower the level of player excitement, because the player may feel as though he or she is not participating in the game.

Thus, there is a need for increasing player excitement by improving wagering game formats that increase the feeling of control a player has over the bonus game.

SUMMARY OF THE INVENTION

The present invention satisfies the needs mentioned above by allowing the player to feel greater control over a wagering game and also maximizes the amount paid. The present invention does so by providing a unique game where a player is allowed to select among different player-selectable game elements and the selected game elements are arranged into groups such that an award associated with the group is maximized. By providing player-selectable elements in the game, the player feels as though they are participating in the game. Also, by arranging the elements into groups such that the award associated with at least one group is maximized, the player achieves greater awards, which is exciting to the player.

In accordance with one embodiment of the present invention, there is provided a gaming terminal and a method for playing a wagering game on the gaming terminal, The method includes conducting a wagering game displaying player-selectable game elements, which include a plurality of value-associated outcomes. The player selects some of the player-selectable game elements, and the selected player-selectable game elements are arranged at least one group, each having an associated award. The groups are arranged so as to maximize at least one of the associated awards.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
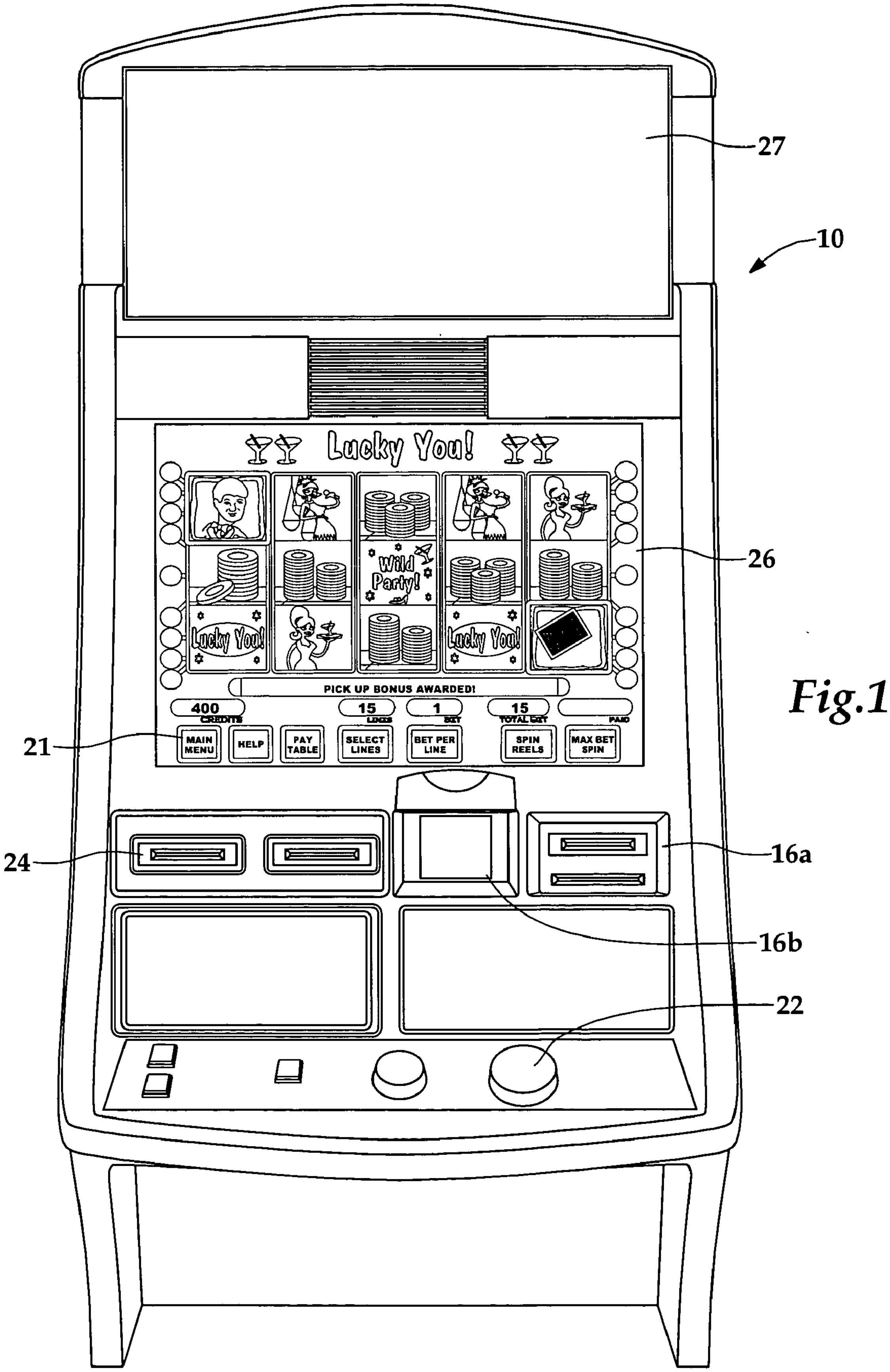
FIG. 1 is a perspective view of a video gaming terminal according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

FIG. 1 shows a perspective view of a typical gaming terminal 10 used by gaming establishments, such as casinos.

With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play video slots or a video casino game, such as blackjack, slots, keno, poker, etc.

As shown, the gaming terminal 10 includes input devices, such as a wager acceptor 16 (shown as a card wager acceptor 16*a* and a cash wager accepter 16*b*), a touch screen 21, a push-button panel 22, and a player-identification card reader 24. For outputs, the gaming terminal 10 includes a main display 26 for displaying information about the basic wagering game, and a secondary display 27 that may display an electronic version of a pay table, and/or also possibly game-related information or other entertainment features. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The cash wager acceptor 16*a* may include a coin slot acceptor or a note acceptor to input value to the gaming terminal 10. The card wager acceptor 16*b* may include a card-reading device for reading a card that has a recorded monetary value with which it is associated. The card wager acceptor 16*b* may also receive a card that authorizes access to a central account, which can transfer money to the gaming terminal 10.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The outcome of the basic wagering game is displayed to the player on the main display 26. The main display 26 may take the form of a cathode ray tube (CRT), a high resolution LCD, a plasma display, LED, or any other type of video display suitable for use in the gaming terminal 10. As shown, the main display 26 includes the touch screen 21 overlaying the entire monitor (or a portion thereof) to allow players to make game-related selections. Alternatively, the gaming terminal 10 may have a number of mechanical reels to display the game outcome, as long as it includes the secondary display 27 for displaying the bonus game feature described below.

The player-identification card reader 24 allows for the identification of a player by reading a card with information indicating his or her true identity. Currently, the identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming terminal 10. The gaming terminal 10 may use the secondary display 27 for providing the player with information about his or her account or other player-specific information.

Figure 2:
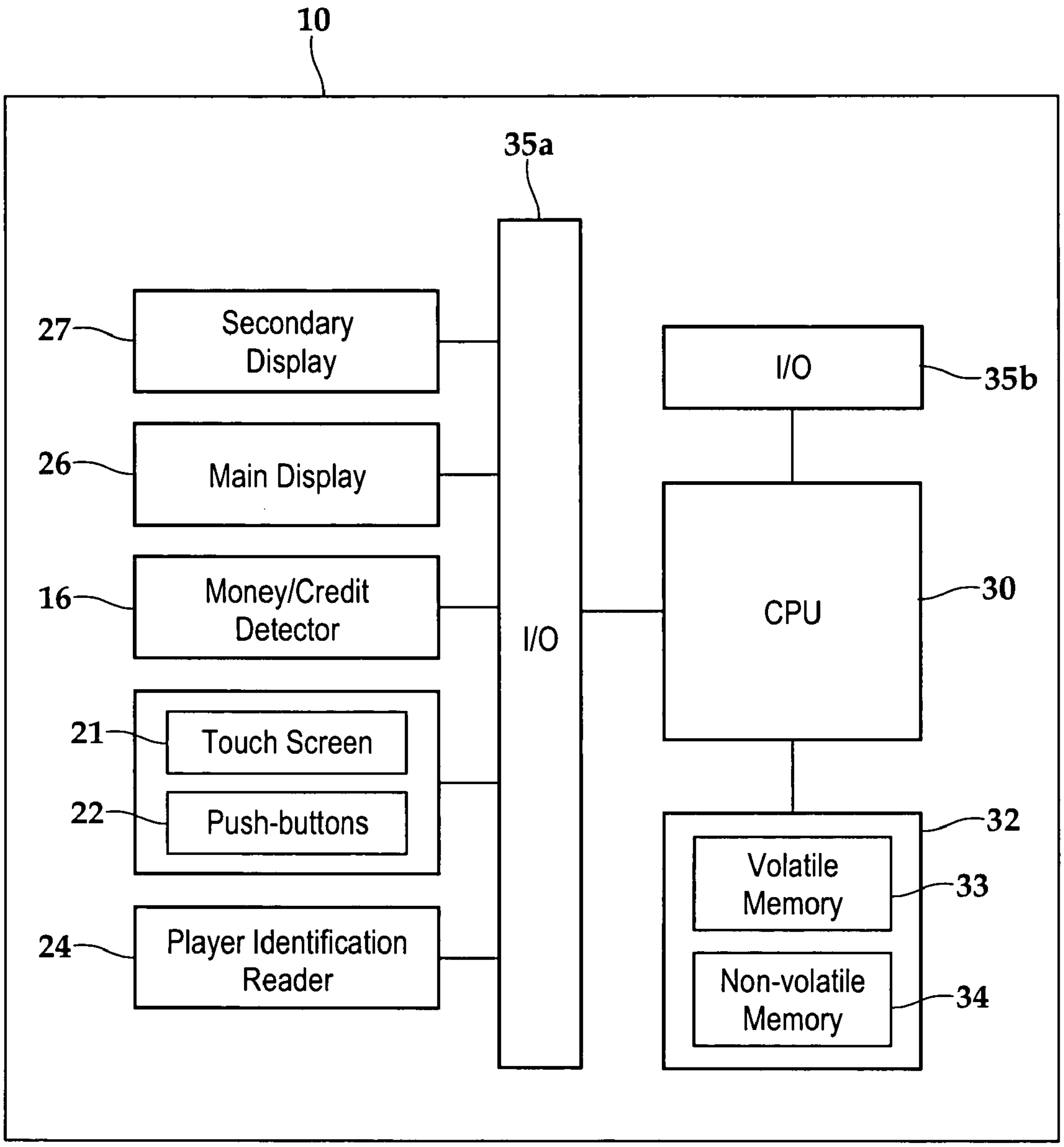
FIG. 2 is a block diagram of the gaming terminal of FIG. 1.

As shown in FIG. 2, the various components of the gaming terminal 10 are controlled by a central processing unit (CPU) 30 (such as a microprocessor or microcontroller). To provide the gaming functions, the CPU 30 executes a game program that allows for the randomly selected outcome. The CPU 30 is also coupled to or includes a system memory 32. The system memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

Figure 3:
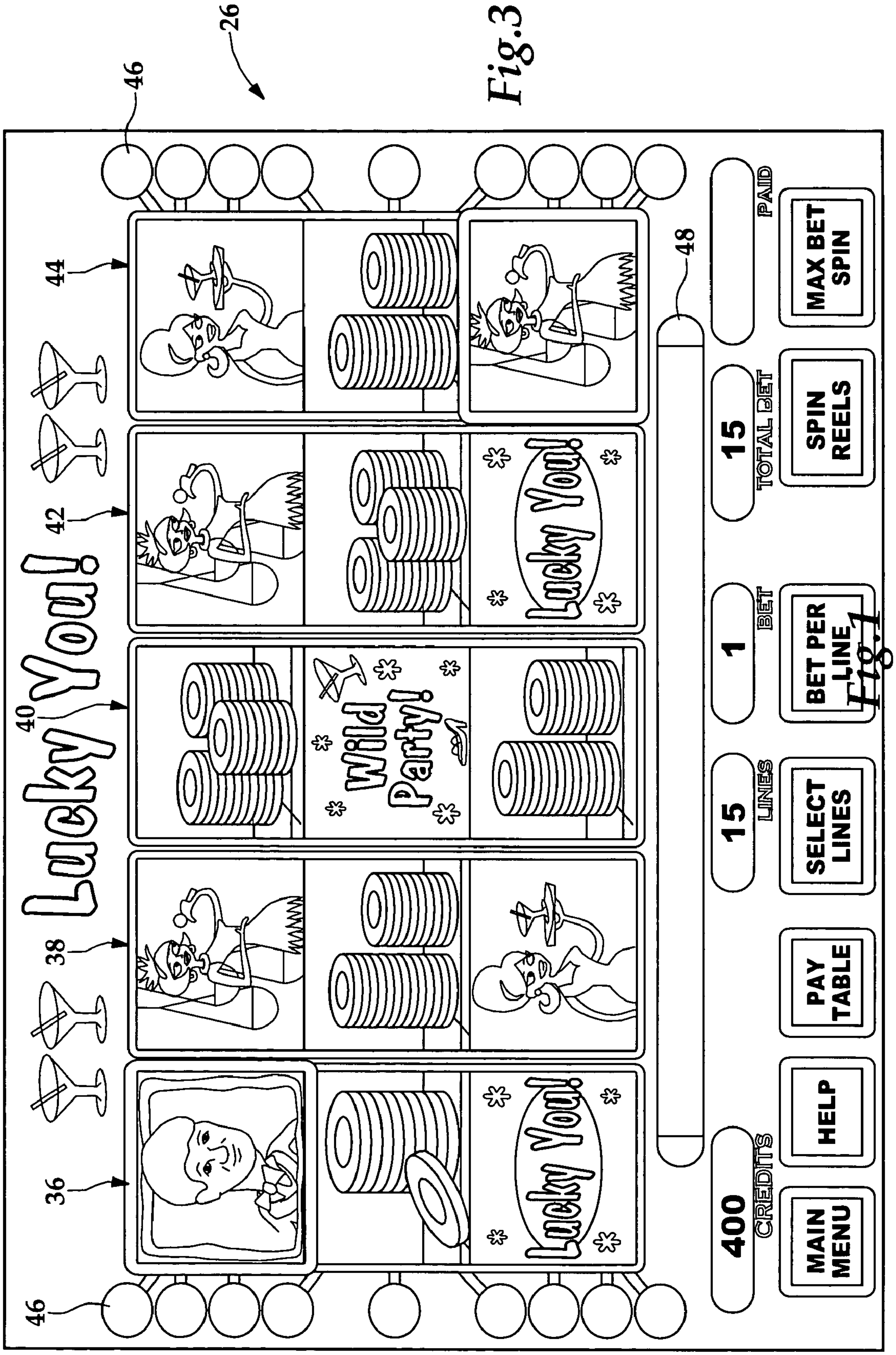
FIG. 3 illustrates a display of a basic game on the gaming terminal of FIG. 1.

Turning now to FIG. 3, the main display 26 of one embodiment of the present invention is shown in more detail. In this embodiment, the basic game is a slot machine game, with symbols on five different reels 36, 38, 40, 42, 44. The reels 36-44 may be either traditional mechanical reels or they may be computer-generated images of reels, with each reel composed of a plurality of symbols. The payline indicators 46 indicate a randomly selected outcome for each payline, which is the combination of symbols on the reels 36-44. Thereafter, an outcome indicator 48 indicates whether the outcome has resulted in a payout, a progressive jackpot, a bonus game, or whether it resulted in nothing. While multiple paylines are shown, a gaming terminal 10 with a single payline will also work with the present invention.

In the present example, the wagering game follows the theme of a Las Vegas Party, where the symbols represent different things generally associated with Las Vegas (e.g., people, singers, waitresses, cards, chips, dice, drinks, etc . . . ). Various combinations of the symbols can result in prizes, including monetary and non-monetary prizes. The non-monetary prizes include free spins, multipliers, entry into a bonus game, entry into a progressive game, etc.

Figure 4:
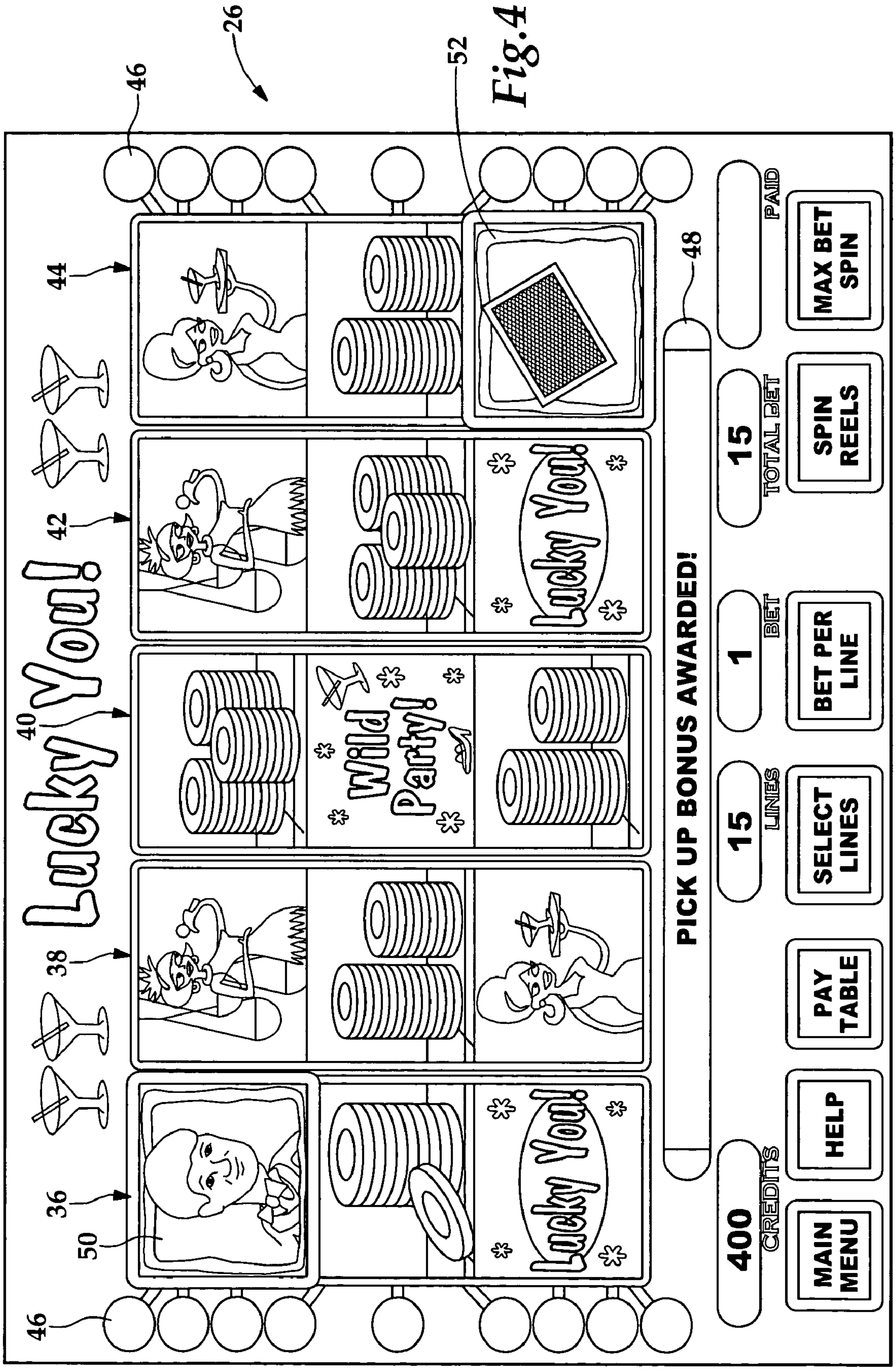
FIG. 4 illustrates a bonus game being triggered on the gaming terminal of FIG. 1.

In this particular embodiment, as shown in FIG. 4, a particular combination of symbols generates entry into a card-based bonus game. The game enters the bonus stage when a particular symbol is present in the first reel 36 and a different symbol is present in the fifth reel 44. In this embodiment, the combination illustrated is a symbol of a person 50 in the first reel 36 along with a deck of cards symbol 52 in the fifth reel 44. In other embodiments, other symbol combinations (including symbols on other reels) may trigger the bonus game.

Figure 5A:
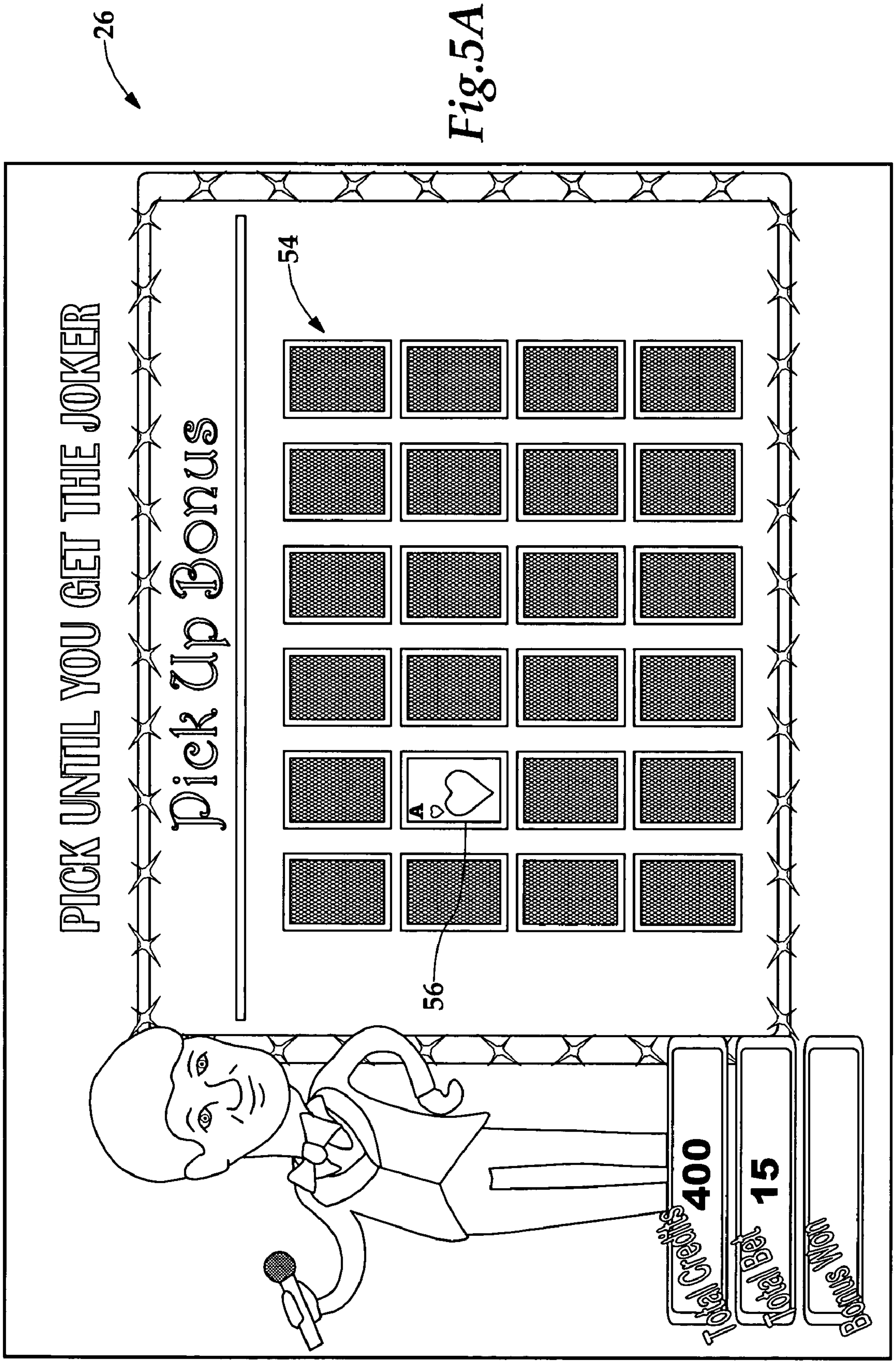
FIGS. 5*a*-5*c* illustrate bonus game screens on the gaming terminal of FIG. 1.

Turning now to FIG. 5*a*, a display of the bonus game is shown that is triggered by the symbol combination in the basic game, as shown in FIG. 4. In this embodiment, the bonus game includes a number of cards 54 placed face down in an array on the main display 26. After the player selects one of the cards, either by pressing the card on the touch screen 21 (FIGS. 1 and 2) or by giving the coordinates of the card, the selected card 56 is revealed to the player. As shown in FIG. 5*a*, the deck of cards 54 is of an abridged deck of 24 cards. In other embodiments, a full deck or any other number of cards may be used. In the illustrated embodiment, the player selected an ace of hearts as the first revealed card.

Figure 5B:
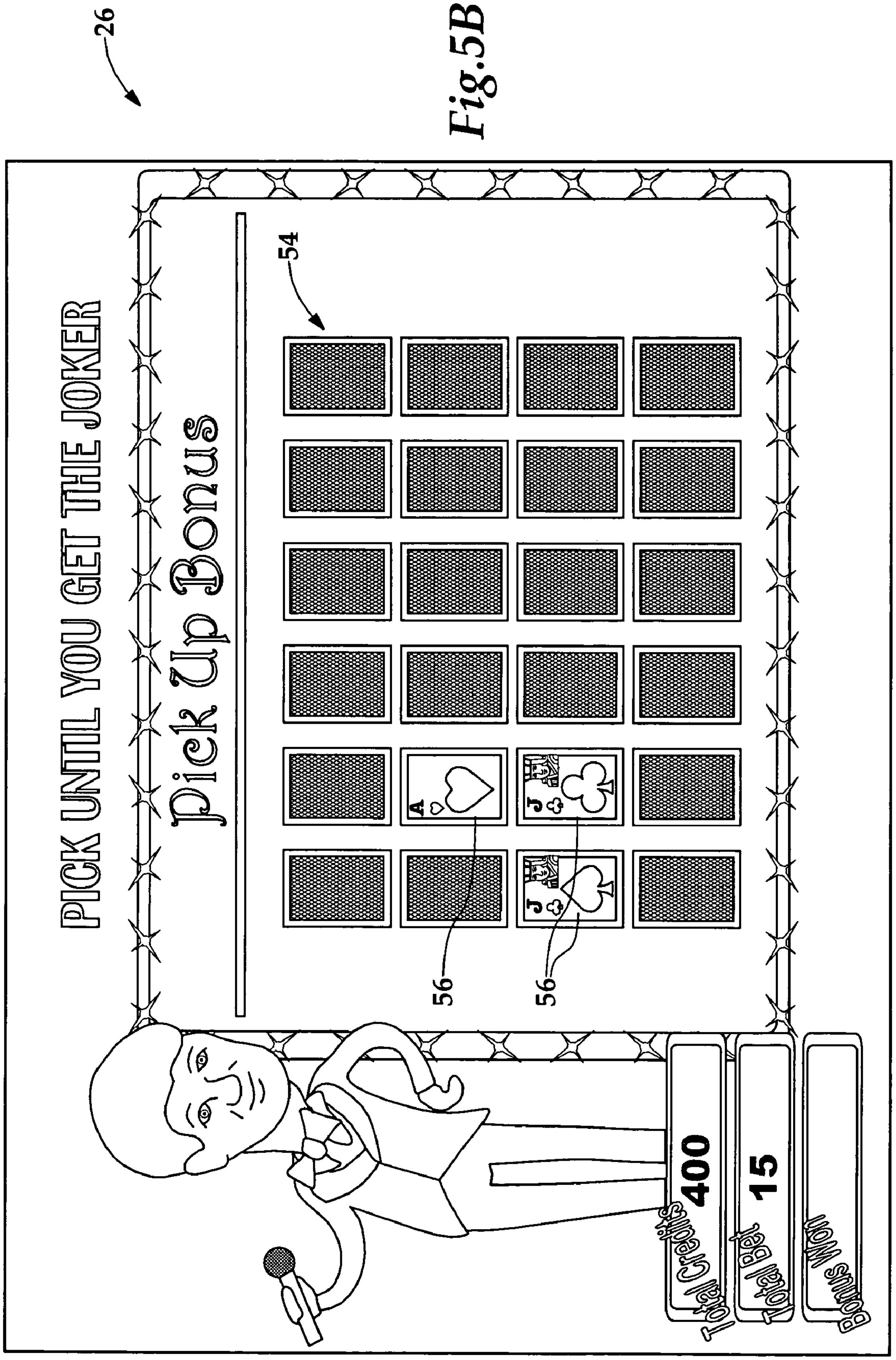
Figure 5C:
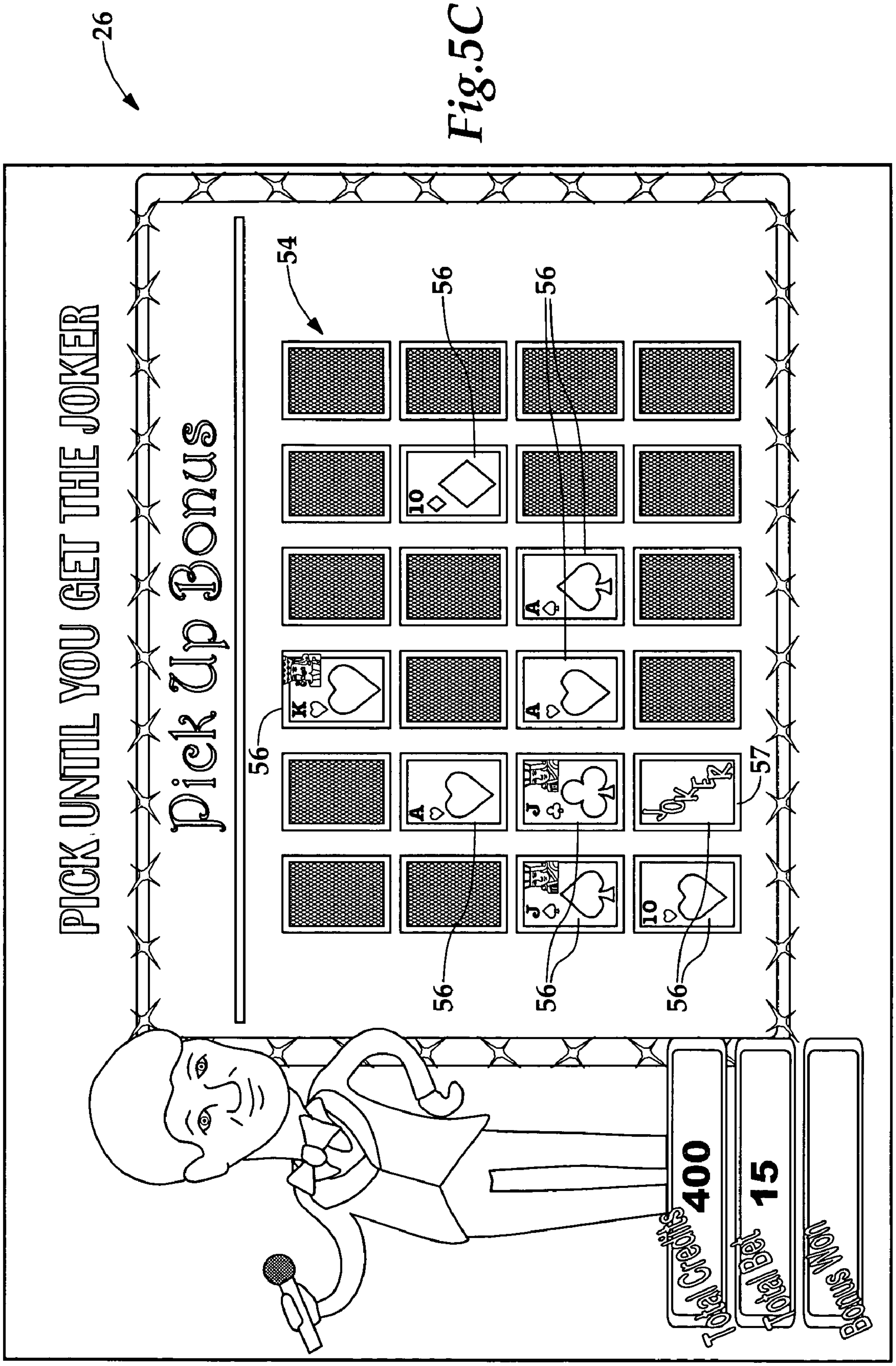

As shown in FIG. 5*b*, the player continues to select cards 54 to be revealed. In this embodiment, the player has so far selected two jacks and an ace. In FIG. 5*c*, the player, after selecting a few more cards 54 (two more aces, two tens and a king) has selected an end-wagering game outcome or element 57, which in this embodiment is a joker.

Figure 6:
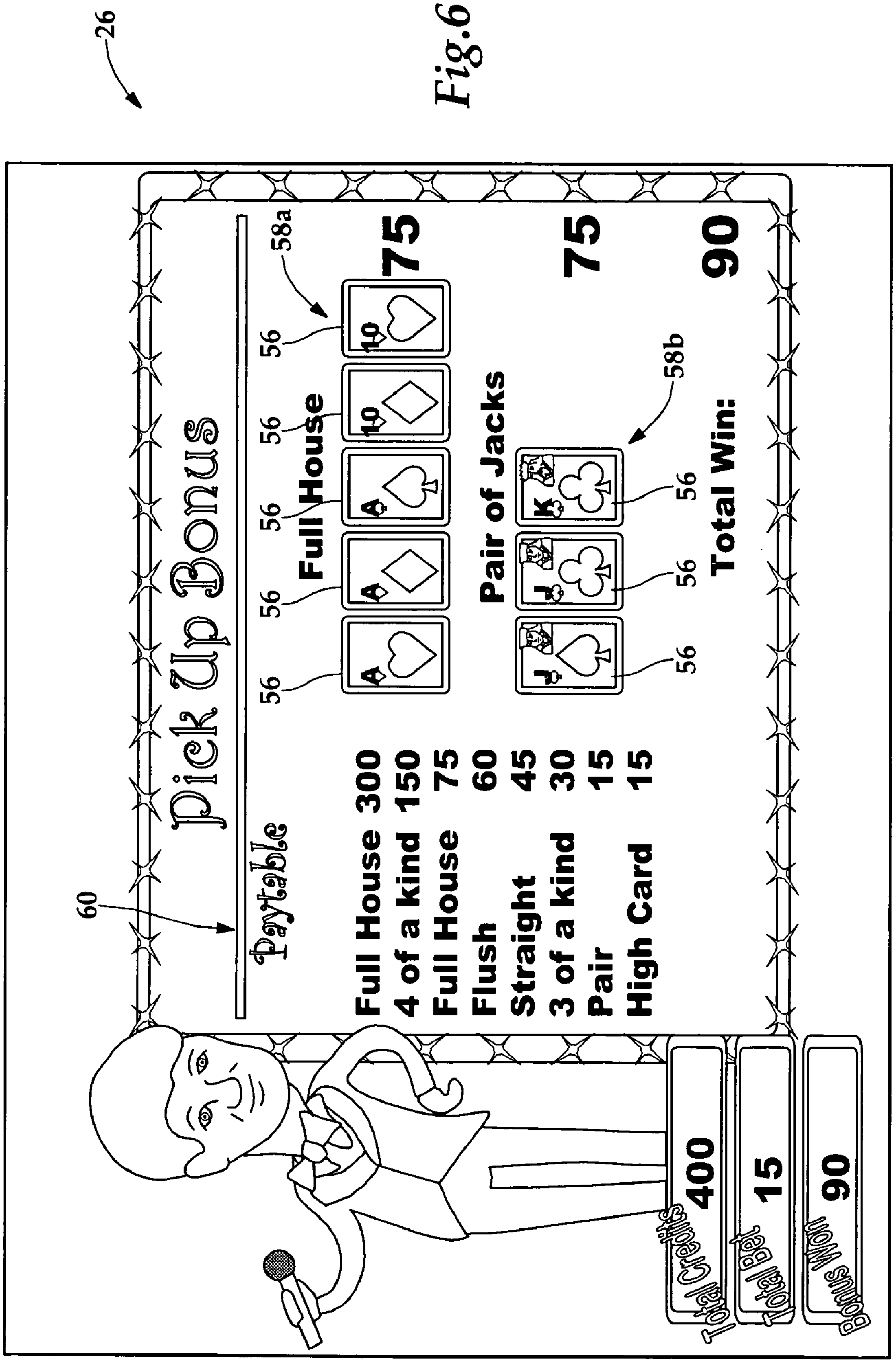
FIG. 6 illustrates an arrangement of selected indicia during the bonus game on the gaming terminal of FIG. 1.

After the joker (or other end-wagering game outcome or element is revealed), which will be described in more detail below, the main display 26 changes to FIG. 6 and the revealed cards 56 are arranged into standard poker hands 58*a*, 58*b*, containing five cards each. The main display 26 in FIG. 6 also includes a paytable 60, illustrating the amounts won for various hands. The number of hands that are made depends on how many cards are revealed. For example, as shown in FIGS. 5*a*-6, eight cards 56 were revealed during the game, so one full hand 58*a* of five cards is created and one hand 58*b* of three cards is created. If fifteen cards were revealed, then three separate five card hands would be created.

The cards are arranged to create a first hand 58*a* that has the highest reward possible, according to the paytable 50. Once that hand 58*a* is determined, the remaining cards are then sorted into a second hand 58*b*. The cards for the second hand 58*b* are also chosen by determining the combination of the remaining cards that would result in the highest reward (i.e., the best hand). This continues until all the revealed cards are arranged in a hand. This is different than how bonuses are awarded in present bonus games. In current bonus games, the symbols or bonus symbols are played as they are chosen. In the present invention, the CPU 30 (FIG. 2) performs a secondary analysis on the cards to arrange the best hands possible. The secondary analysis gives the player a higher reward during the bonus game, and thus makes it more exciting and fulfilling for the player.

The above screens were related to a particular embodiment, where the bonus game relates to a deck of cards. In other embodiments, the bonus game could be other indicia, such as reel symbols from a standard slot machine. In that embodiment, the reel symbols may be arranged into groups of three or five symbols (the standard number of symbols in a payline for slot machines) according to the same principles that the cards were arranged above. Also, in other embodiments, the cards may be divided into hands having another number of cards that is standard in poker (e.g., three cards or seven cards), instead of five.

Figure 7:
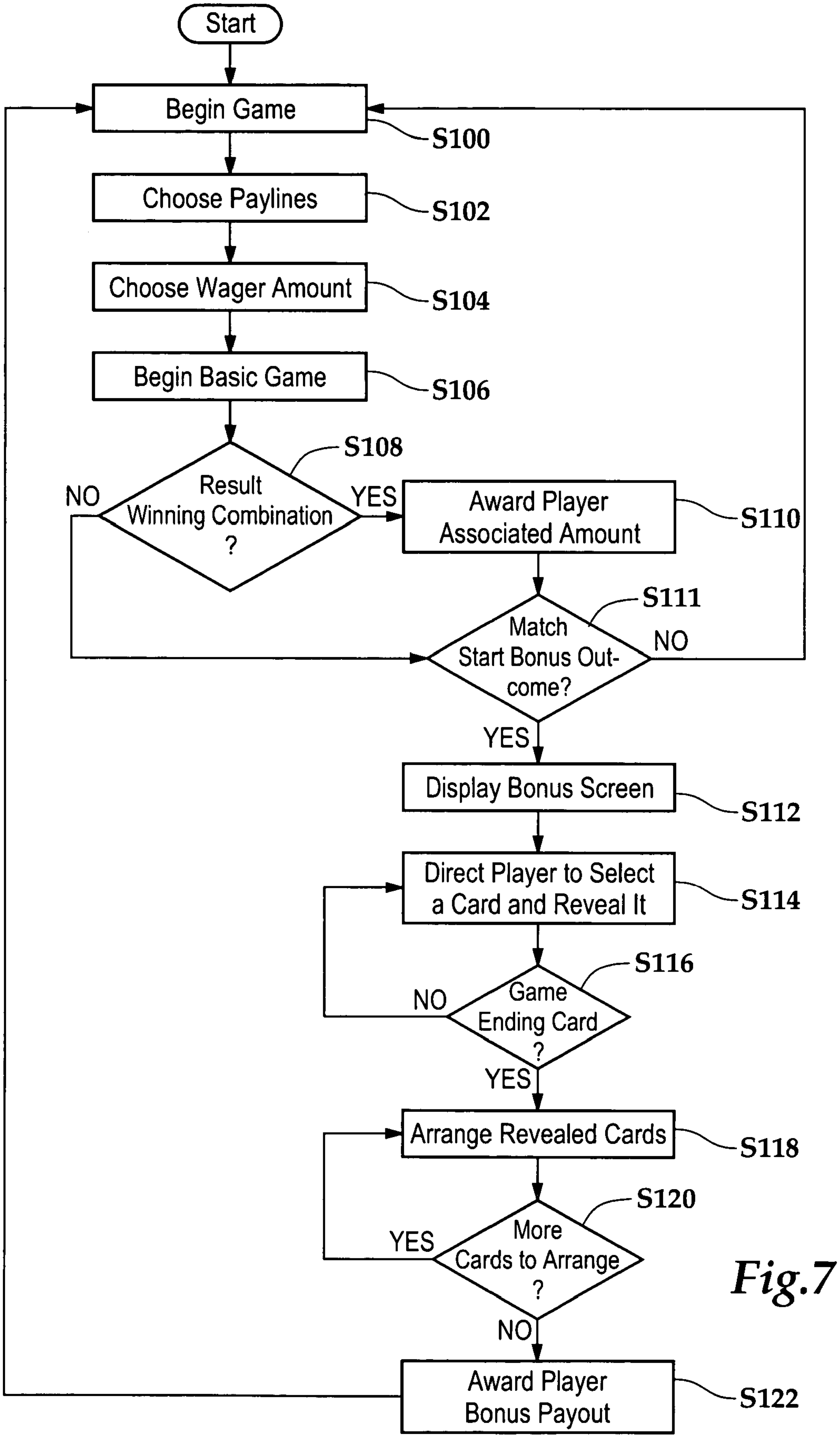
FIG. 7 is a flow chart describing the method of playing the bonus game.

Turning now to FIG. 7, the operation detailing the method of playing the game according to the illustrated embodiment of the invention will be described. In step s100, a player at the gaming terminal 10 begins a gaming session by any conventional method (e.g., inserting coins or using credits). The gaming terminal 10 has a basic wagering game that involves a player making various inputs, including, for example, choosing a number of paylines to play (step s102). In some embodiments, there are a maximum of nine paylines, as shown in the gaming terminal 10 of FIG. 1. In other embodiments, there may only be a single payline. In those embodiments, this step would be skipped. After choosing how many paylines to play, the player selects how many credits (e.g., 1-5) to wager on each payline (step s104).

Regarding eligibility for the bonus game, in some embodiments, the player is only eligible for the bonus game if the player chooses to play all of the paylines and/or the player wagers the maximum amount on each of the paylines played. In other embodiments, the player is automatically eligible for the bonus game, and is not required to make a minimum wager or to play a minimum number of lines. In some other embodiments, there is a "side-wager" option that allows the player to be eligible for the bonus game. The "side-wager" option is described in U.S. patent application Ser. No. 10/659,878, filed on Sep. 11, 2003, entitled "Gaming Machine With Multi-Level Progressive Jackpot," which is commonly owned and herein incorporated by reference in its entirety.

At step s106, the player begins the basic wagering game, thereby causing the reels to spin and display a symbol combination that corresponds to the randomly selected outcome from the CPU 30 (FIG. 2). At step s108, it is determined if the randomly selected outcome (i.e., arrangement of symbols) is one of the winning outcomes according to a basic-game pay table (not shown). If the answer is "yes," then the gaming system progresses to step s110, and awards the player with the associated payout amount.

If the answer at step s108 is "no," or, after the payout has been awarded at step s110, then the gaming terminal 10 determines whether the randomly selected outcome matches one of the outcomes associated with entering a bonus game (e.g. having the combination of symbols discussed above) (step s111). If the answer is "no", the game returns to step s100 and the game begins again.

If the randomly selected outcome is a start-bonus outcome that causes entry to the bonus game, then terminal advances to step s112, and the bonus game screen is displayed. As stated above in reference to FIG. 5, the bonus game is set up as an array of cards 54. The player is then directed to select a card (step s114), which is then revealed (the revealed card 56 of FIG. 5). In this embodiment, the array of cards 54 include both game-ending symbols and symbols representing cards. If the card is not a game-ending symbol such as a joker, the player is invited to select another card (step s116).

If the card is a joker, or other game-ending symbol, the process then progresses to step s118. The revealed cards are then arranged, under the control of the CPU 30, into a five card (or less if less cards are remaining) poker hand. The cards to be arranged into the hand are chosen based on which five cards would generate the greatest payout to the player based on the paytable 60 shown in FIG. 6. Then, at step s120, the system inquires if there are still cards left to be arranged. If there are, the CPU 30 returns to step s118 and performs the secondary analysis to determine the maximum payout as determined by an arrangement of the remaining cards.

Once all the cards have been arranged into hands, the value of the various hands is added up and the player is awarded the total payout amount (step s120). The CPU 30 then returns to the initial step of inviting the player to make a wager to begin the basic game.

In some embodiments, the cards may be arranged so as to maximize the total bonus payout instead of the individual hand. For example, the best hand may offer an award of 35 credits, with the remaining cards offering a payout of 10 credits. However, the second best hand may have an award of 25 credits, with the remaining cards also creating a hand having an award of 25 credits. Under this embodiment, the second best hand and the remaining hands would be awarded to the player, because it increases the overall payout to the player.

In other embodiments, the players may choose a pre-selected number of cards that differs from the number normally found in a hand of poker (i.e. a number different than five or seven). In these embodiments, there are no "game ending" or "bonus-ending" cards such as the joker, because the player only picks a set amount, either more or less than the usual poker hand. The cards are then arranged into hands as described by the methods discussed above.

In some embodiments, the awards given by the bonus game may not be credits, or monetary in nature. The awards may be non-monetary awards, such as free spins, multipliers, wild cards, etc.

Although the above embodiments have been described relative to a bonus game, it should be understood that the invention could be used in the basic game of the gaming terminal 10. In such an embodiment, the cards are selected as a part of the basic game.

While the present invention has been described with reference to one or more particular embodiments, those skilled in the art will recognize that many changes may be made thereto without departing from the spirit and scope of the present invention. For example, instead of the CPU 30 performing the bonus game analysis described above, a separate process dedicated to only the bonus game can perform the analysis. Such a processor can be located within the gaming terminal 10, or external to the gaming terminal 10. Each of these embodiments and obvious variations thereof is contemplated as falling within the spirit and scope of the claimed invention, which is set forth in the following claims.

What is claimed is:

1. A method of playing a wagering game, comprising:
conducting the wagering game at a gaming terminal;
displaying a plurality of player-selectable game elements concealing a plurality of value-associated outcomes and at least one end-wagering game outcome, the at least one end-wagering game outcome not being playable for an associated award;
selecting, via player inputs, at least one of the plurality of player-selectable game elements until encountering the at least one end-wagering game outcome;
arranging, after the encountering of the at least one end-wagering game outcome, the value-associated outcomes of the selected player-selectable game elements into at least one of a plurality of known groups, each having an associated award, the arranged selected player-selectable game elements not including the at least one end-wagering game outcome, wherein the arrangement is made so as to maximize at least one of the associated awards; and
awarding a wagering game payoff based on the arranging.

2. The method of claim 1, wherein the arranging the player-selectable game elements includes arranging the elements so as to maximize all of the associated awards.

3. The method of claim 1, wherein the selectable game elements comprise cards from a deck of playing cards.

4. The method of claim 3, wherein the arranging the player-selectable game elements includes arranging the cards into poker hands.

5. The method of claim 4, wherein the arranging the cards into poker hands comprises arranging the cards into five-card poker hands.

6. The method of claim 1, wherein the selectable game elements comprise reel symbols.

7. The method of claim 6, wherein the arranging the player-selectable game elements includes arranging the reel symbols into standard winning combinations.

8. The method of claim 7, wherein the arranging the reel symbols into standard winning combinations comprises arranging the reel symbols into five symbol winning combinations.

9. The method of claim 1, further including receiving player-identification information, the awarding step comprising crediting an amount to a player account indicated in the player-identification information.

10. The method of claim 1, wherein the wagering game includes a basic game, and the plurality of player-selectable game elements are displayed during the basic game.

11. The method of claim 1, wherein the wagering game includes a basic game and a bonus game, the basic game having a plurality of outcomes including a start-bonus game outcome, and the plurality of player-selectable game elements are displayed during the bonus game, in response to achieving the start-bonus game outcome in the basic game.

12. A method of playing a wagering game, comprising:
conducting the wagering game at a gaming terminal, the wagering game having a standard number of indicia;
displaying a plurality of concealed indicia simultaneously during the wagering game;
selecting, via player inputs, a number of the plurality of concealed indicia until a predetermined number of indicia is chosen, the predetermined number of indicia not equal to the standard number of indicia;
revealing only the selected indicia;
arranging the revealed indicia into groups after the selecting step is finished, the groups corresponding to one or more of a plurality of predefined winning combinations, wherein the arrangement is made so as to maximize at least one of the plurality of predefined winning combinations; and
awarding a wagering game payoff based on the arranging.

13. The method of claim 12, wherein the predetermined number of indicia is greater or less than five.

14. The method of claim 12, wherein the predetermined number of indicia is greater or less than seven.

15. The method of claim 12, wherein the wagering game includes a basic game and the plurality of indicia are displayed during the basic game.

16. The method of claim 15, wherein the wagering game includes a basic game and a bonus game, the method further comprising:
achieving a bonus game entry outcome at the gaming terminal; and
activating the bonus game in response to achieving the bonus game entry outcome;
wherein the plurality of indicia are displayed during the bonus game.

17. A method of playing a wagering game, comprising:
conducting the wagering game at a gaming terminal;
simultaneously displaying a plurality of player-selectable game elements, each having an associated concealed card from a deck of cards;
selecting, only via player inputs, a predetermined number of the simultaneously displayed plurality of player-selectable game elements, the predetermined number of the selected player-selectable game elements not being equal to a number of cards in a standard poker hand, the number of cards in the standard poker hand being between three to seven cards;
revealing only the associated card from each of the selected player-selectable game elements;
arranging the revealed cards into one or more card groups having corresponding awards after the predetermined number of the plurality of player-selectable game elements is selected, wherein the arrangement is made so as to maximize at least one of the one or more awards; and
awarding a wagering game payoff based on the arranging.

18. The method of claim 17, wherein the predetermined number of indicia is greater or less than five.

19. The method of claim 17, wherein the predetermined number of indicia is greater or less than seven.

20. The method of claim 17, wherein the arranging step is made so as to maximize the wagering game payoff.

21. The method of claim 17, wherein the wagering game includes a basic game and the plurality of indicia are displayed during the basic game.

22. The method of claim 17, wherein the wagering game includes a basic game and a bonus game, the basic game having a plurality of outcomes, including a start-bonus game outcome, and the plurality of player-selectable game elements are displayed in response to the outcome of the basic game being the start-bonus game outcome.

23. A gaming terminal comprising:
at least one input device to receive an input indicative of a wager to play a wagering game;
at least one display device;
at least one processor operative to:
display on the at least one display device a plurality of player-selectable game elements each concealing associated indicia for incorporation into groups having up to a standard number of indicia,
reveal the associated indicia only after a player selection, the player selection continuing until a predetermined number of indicia is selected, the predetermined number of indicia not equal to the standard number of indicia, and arrange only the revealed indicia into groups corresponding to one or more of a plurality of winning combinations, the revealed indicia being arranged, after a player has finished selecting, to maximize at least one of a plurality of winning combinations.

24. The terminal of claim 23, wherein the revealed indicia are arranged so as to maximize all of the plurality of winning combinations.

25. The terminal of claim 23, wherein the player-selectable game elements comprise cards from a deck of playing cards.

26. The terminal of claim 25, wherein the cards are arranged into at least one poker hand.

27. The terminal of claim 26, wherein the poker hand comprises five cards.

28. The terminal of claim 23, wherein the player-selectable game elements comprise reel symbols.

29. The terminal of claim 28, wherein the reel symbols are arranged into standard winning combinations.

30. The terminal of claim 29, wherein the standard winning combinations include five reel symbols.

31. The terminal of claim 23, wherein the wagering game includes a basic game and the player-selectable game elements are displayed during the basic game.

32. The terminal of claim 23, wherein the wagering game includes a basic game and a bonus game, the basic game having a plurality of symbols that indicate a randomly selected outcome of the basic game, and the plurality of player-selectable game elements are displayed in response to the randomly selected outcome being a start-bonus game outcome.

33. A gaming system comprising:

at least one display;

at least one gaming terminal for playing a wagering game; and a controller coupled to the at least one gaming terminal and the at least one display, the controller operative to (i) cause the display to display a plurality of player-selectable game elements, the plurality of player-selectable game elements concealing a plurality of value-associated outcomes and at least one end-wagering game outcome, the at least one end-wagering game outcome not being playable for an associated award, (ii) determine a wagering game payoff based on selections by a player of the player-selectable game elements, the wagering game ending when the at least one end-wagering game elements is selected, and (iii) arranging the selected player-selectable game elements to maximize the wagering game payoff after the at least one end-wagering game element is selected, the arranged selected player-selectable game elements not including the at least one end-wagering game outcome.

34. The system of claim 33, wherein the player-selectable game elements includes cards from a deck of playing cards.

35. The system of claim 34, wherein the end-wagering game element is a card bearing a joker symbol.

36. The system of claim 34, wherein the controller is operable to arrange the selected player-selectable game elements into at least one poker hand.

37. The system of claim 34, wherein the controller is operable to arrange the selected player-selectable game elements into at least one poker hand having five cards.

38. The system of claim 34, wherein the controller is operable to arrange the selected player-selectable game elements into a plurality of poker hands, continuing to place the selected player-selectable game elements into a poker hand until there are no more selected player-selectable game elements.

39. The system of claim 33, wherein the display is further operable to display the value associated with each of the plurality of value-associated outcomes.

40. The system of claim 33, wherein the controller is housed within the at least one gaming terminal.

41. The system of claim 33, wherein the wagering game includes a basic game and a bonus game, the controller triggering the bonus game when a start-bonus outcome is achieved in the basic game, and the controller is operative to cause the display to display the plurality of player-selectable elements in response to the start-bonus outcome being achieved.

42. A gaming terminal for playing a wagering game having a basic game and a bonus game, comprising:

an input device for receiving inputs from a player during the wagering game, the inputs including a wager amount;

a display for displaying a randomly selected outcome of the wagering game in response to receiving the wager amount from the player; and a controller operative to (i) in response to the bonus game being triggered, cause the display to simultaneously display a plurality of player-selectable game elements, the player-selectable game elements having associated indicia representing a plurality of value-associated outcomes that are revealed only after a player selection, (ii) determine a bonus game payoff based on an arrangement of the selected player-selectable game elements into one or more groups of the revealed indicia, the bonus game ending when the player has selected a predetermined number of player-selectable game elements not equal to a standard number for a game chosen, and (iii) arrange only the revealed indicia after the selection of player-selectable game elements is finished to maximize the bonus game payoff of at least one of the one or more groups of revealed indicia.

43. The terminal of claim 42, wherein the revealed indicia represent symbols of cards from a deck of playing cards.

44. The terminal of claim 43, wherein the controller is operative to reveal a set number of indicia that is not equal to five or seven.

45. The terminal of claim 43, wherein the revealed indicia represent reel symbols.

46. The terminal of claim 45, wherein the controller is operative to reveal a set number of indicia that is not equal to three or five.

47. A method of playing a wagering game comprising:

conducting a wagering game at a gaming terminal;

achieving a bonus game entry outcome at the gaming terminal;

activating a bonus game in response to achieving the bonus game entry outcome;

displaying a plurality of player-selectable game elements during the bonus game, the player-selectable game elements including a plurality of value-associated outcomes and at least one end-bonus game outcome, the at least one end-wagering game outcome not being playable for an associated award;

selecting, via player inputs, at least one of the plurality of player-selectable game elements until encountering the at least one end-bonus game outcome;

performing secondary analysis on the selected player-selectable game elements not including the at least one end-wagering game outcome, after the selection of the at least one end-bonus game outcome to determine a bonus award; and awarding the bonus award based on the secondary analysis.

* * * * *